Jan. 22, 1952 M. L. LAMBETH 2,583,218
COMBINED POULTRY FEEDER AND WATERER
Filed Nov. 13, 1946
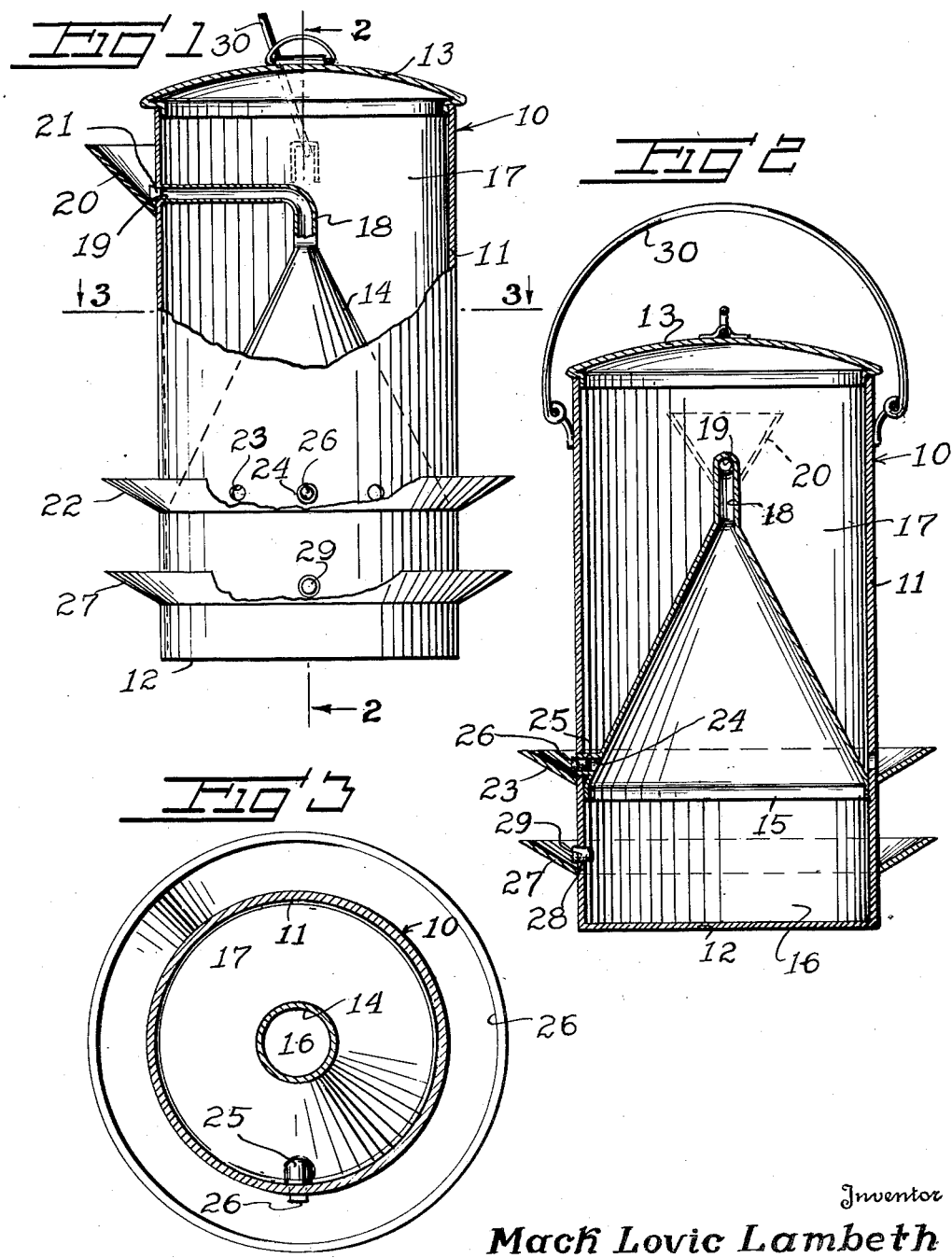
Inventor
Mack Lovic Lambeth Patented Jan. 22, 1952

2,583,218

UNITED STATES PATENT OFFICE 2,583,218

COMBINED POULTRY FEEDER AND WATERER

Mack Lovic Lambeth, De Queen, Ark.

Application November 13, 1946, Serial No. 709,494

4 Claims. (Cl. 119—51.5)

This invention relates generally to the class of animal husbandry and pertains particularly to improvements in feeding and watering devices.

A principal object of the present invention is to provide a combination feeding and watering device designed primarily for use by poultry, wherein the construction is of a novel character to utilize the heat insulating qualities of poultry feed for the purpose of protecting water in the device to prevent the latter from freezing in the winter and from becoming excessively warm in the summer.

Another object of the invention is to provide a combination poultry feeding and watering fountain in which the major portion of the water reservoir is surrounded by the feed so that the water will be protected by the feed against freezing or against becoming unduly warm, and means is provided whereby communication may be established between the water reservoir and the trough into which the feed is discharged so that wet feed or wet mash may be supplied to the poultry when desired.

Still another object of the invention is to provide a combination poultry feeder and waterer which is constructed in a novel manner whereby the water reservoir may be refilled easily and quickly without having to disturb the position of the feeder.

A still further object of the invention is to provide a combination poultry feeder and waterer which is of compact form and which may be economically constructed from sheet metal of any suitable or desirable weight or character.

The invention will be best understood from a consideration of the following detailed description taken in connection with the accompanying drawing forming a part of the specification with the understanding, however, that the invention is not confined to a strict comformity with the showing of the drawing but may be changed or modified so long as such changes or modifications mark no material departure from the salient features of the invention as expressed in the appended claims.

In the drawing:

Figure 1 is a view partly in side elevation and partly in vertical section through a combination poultry feeder and waterer constructed in accordance with the present invention.

Figure 2 is a vertical section taken substantially on the line 2—2 of Figure 1.

Figure 3 is a horizontal section taken on the line 3—3 of Figure 1.

Referring now more particularly to the drawing, it will be seen that the body of the feeder and waterer, which is generally designated 10, is of one piece construction and preferably is of circular cross section. In other words the body 10 is in the form of an upright, relatively long cylindrical housing having the circular side wall 11 and the bottom wall 12, the top of the housing being open initially but covered by the removable top or closure 13.

Disposed within the housing is a hollow cone or funnel shaped body which forms an upwardly tapering partition wall 14. The lower edge or periphery of this conical wall, designated 15, engages the inner surface of the circular wall 11 and is secured thereto in water tight contact therewith, thereby dividing the housing into the lower chamber 16 which forms the water reservoir and which extends upwardly into the conical partition 14, as shown, and the upper chamber 17 which constitutes the feed chamber or feed reservoir. As shown the lower part of this feed chamber 17 extends down around the major portion of the conical wall 14.

The tapered upper end or apex of the conical wall is joined integrally with the right angled conduit or spout 18, one portion of which extends directly vertically on the longitudinal center of the housing while the other portion extends laterally to and opens through the housing wall forming the water inlet or supply port 19.

Upon the outer side of the housing wall 11 is secured the upwardly opening cup 20 which extends a substantial distance above the supply opening 19 as shown. By means of this cup the introduction of water into the chamber 16 is facilitated by pouring the water supply into the cup and allowing it to flow through the conduit 18 to the chamber 16.

In the use of the feeder and waterer the opening or port 19 is closed by a plug 21.

Encircling the housing at an elevation slightly above the peripheral portion 15 of the conical wall 14, is the trough 22 into which the feed is received from the feed chamber 17 through the apertures 23 which are formed through the wall 11 and around the body.

Extending through an aperture 24 into the trough 22 is an end of a nipple 25 which at its inner end opens through the conical wall 14 into the water chamber. The outer end of this nipple is closed by a removable plug 26 and this plug is removed when it is desired to run water from the water chamber into the feed trough for the purpose of supplying the poultry with wet feed. At all other times the plug 26 is kept in the nipple 25 so that only dry feed will flow through the openings 23 into the feed through 22.

Except at such times as the plug 26 is removed for the purpose of supplying the poultry with wet feed, the hereinafter described outlet for the water trough is kept closed.

Below the feed trough 22 the housing is encircled by the water trough 27. The wall 11 of the housing has a water discharge aperture 28 therethrough which opens into the water trough 27. This aperture 28 is supplied with a plug 29 which is made use of at those times when the plug 26 is removed for the purpose of wetting the feed in the trough 22, and when the plug 29 is removed for the purpose of filling the water chamber 16. After the water chamber has been filled the plug 21 is replaced and the plug 29 is removed.

For the convenient transportation of the feeder and waterer a bale handle 30 may be attached to the top of the housing in the manner shown so that the entire structure can be picked up and carried from place to place.

From the foregoing it will be readily seen that water in the water chamber is enclosed by the feed in the feed chamber and consequently such water will be insulated by the feed against heat and cold. Thus the poultry will be assured at all times during freezing winter weather, of a constant supply of water and in the summer time the water will be sufficiently protected to keep it from becoming excessively warm.

I claim:

1. A combination poultry feeder and waterer comprising a housing having a vertical side wall, a bottom wall and an open top, a cover for said open top, a water trough connected with and supported by the side wall adjacent the lower portion of the housing and above the bottom wall, a feed trough connected with and supported by the side wall at an elevation above the water trough, means within the housing and secured to the side wall in a transverse plane just below the feed trough and dividing the housing into an upper feed chamber and a lower water chamber, means interconnecting the feed chamber and feed trough for discharging feed from the feed chamber into the feed trough, means interconnecting the water chamber and water trough for discharging water from the water chamber into the water trough, and said housing dividing means having its major portion extended centrally up into the feed chamber through the major part of the length of the chamber so that a substantial portion of the feed chamber encloses a substantial portion of the water chamber whereby feed in the feed chamber functions as insulation means for water in the water chamber.

2. A poultry feeder and waterer of the character stated in claim 1, with a water conduit interconnecting the water chamber and feed trough for diverting water from the water chamber into the feed trough.

3. A combined poultry feeder and waterer comprising an upright cylindrical housing, a relatively long hollow conical partition body disposed within the housing and having the periphery of the base portion thereof secured to the housing wall to divide the housing into a lower water chamber and an upper feed chamber, a feed trough secured to and encircling the housing at approximately the elevation of the lower end of the partition wall, means interconnecting said feed chamber and feed trough for discharging feed from the feed chamber into said feed trough, a second trough secured to and encircling the housing below the first trough, the cylindrical housing having an opening for feeding water from the water chamber into the second trough, a removable closure in said opening, a conduit interconnecting the water chamber and feed trough for conveying water from the water chamber into the feed trough, means operatively associated with said housing for introducing water into the water chamber, and removable closure means carried by the housing for introducing feed into the feed chamber.

4. A combined poultry feeder and waterer comprising an upright cylindrical housing, a relatively long hollow conical partition body disposed within the housing and having the periphery of the base portion thereof secured to the housing wall to divide the housing into a lower water chamber and an upper feed chamber, a trough secured to and encircling the housing at approximately the elevation of the lower end of the partition wall, means interconnecting said feed chamber and trough for discharging feed from the feed chamber into said trough, a second trough secured to and encircling the housing below the first trough, means interconnecting the water chamber and said second trough for discharging water from the water chamber into the second trough, means for introducing water into the water chamber, and a removable closure seated on said housing whereby feed may be introduced into the feed chamber, the said means for introducing water into the water chamber comprising a conduit forming a continuation of the upper end of the conical partition and extending laterally and opening through the side wall of the housing, means for closing the end of the conduit opening through the housing wall, and a cup-like member secured to the outer side of the housing wall and into which the end of said conduit opens.

MACK LOVIC LAMBETH.

REFERENCES CITED

The following references are of record in the file of this patent:

UNITED STATES PATENTS

| Number | Name | Date |
| --- | --- | --- |
| 364,557 | Walin | June 7, 1887 |
| 1,051,823 | Reavis | Jan. 28, 1913 |
| 1,343,349 | Caspe | June 15, 1920 |
| 1,527,360 | Harless | Feb. 24, 1925 |
| 2,191,811 | Trampier, Sr. | Feb. 27, 1940 |
| 2,298,398 | Marshaus | Oct. 13, 1942 |

FOREIGN PATENTS

| Number | Country | Date |
| --- | --- | --- |
| 471,642 | Germany | Feb. 15, 1929 |